C. SCHEUNER.
PNEUMATIC TIRE.
APPLICATION FILED JUNE 12, 1907.
903,891.
Patented Nov. 17, 1908.
2 SHEETS—SHEET 1.
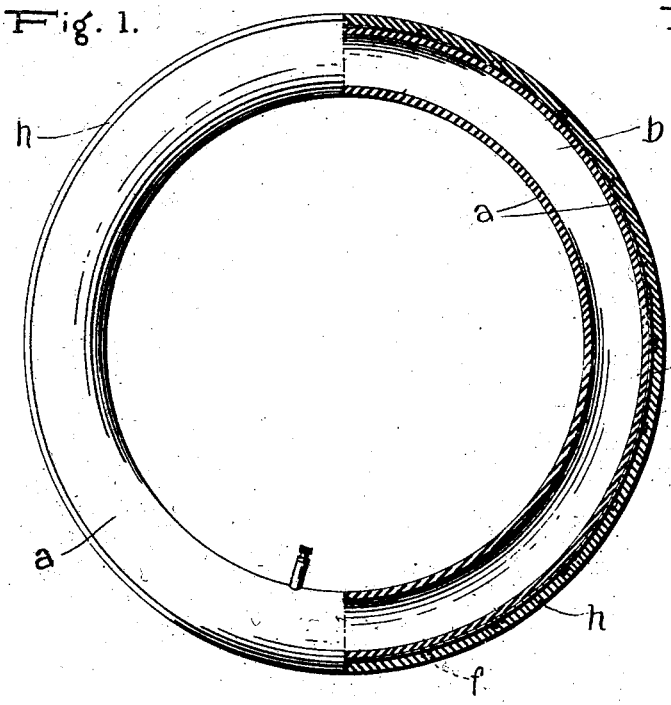
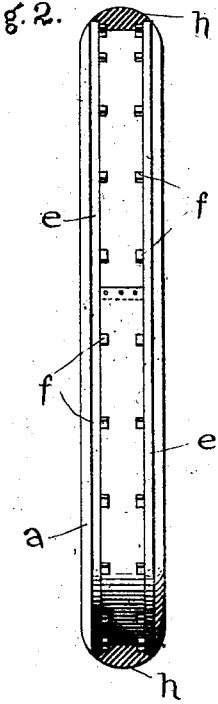
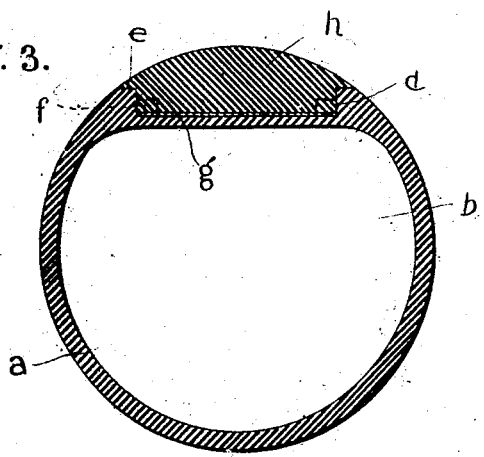
Witnesses
Stuart Hilder.
George M. Anderson.
Inventor
Charles Scheuner
By
E. W. Anderson
his Attorney C. SCHEUNER.
PNEUMATIC TIRE.
APPLICATION FILED JUNE 12, 1907.
903,891.
Patented Nov. 17, 1908.
2 SHEETS—SHEET 2.
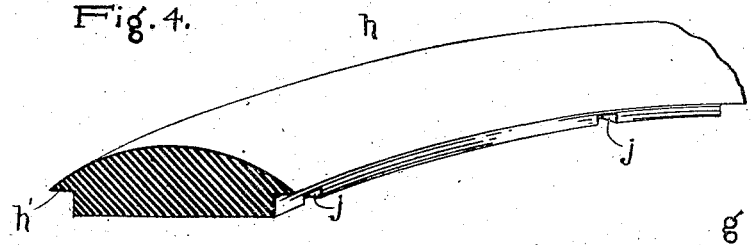
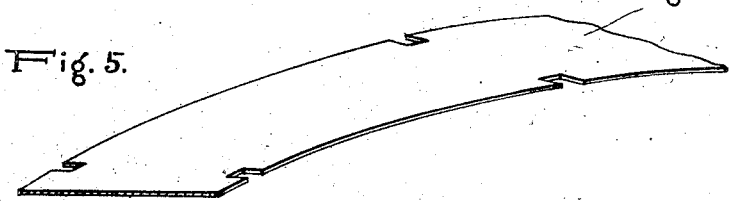
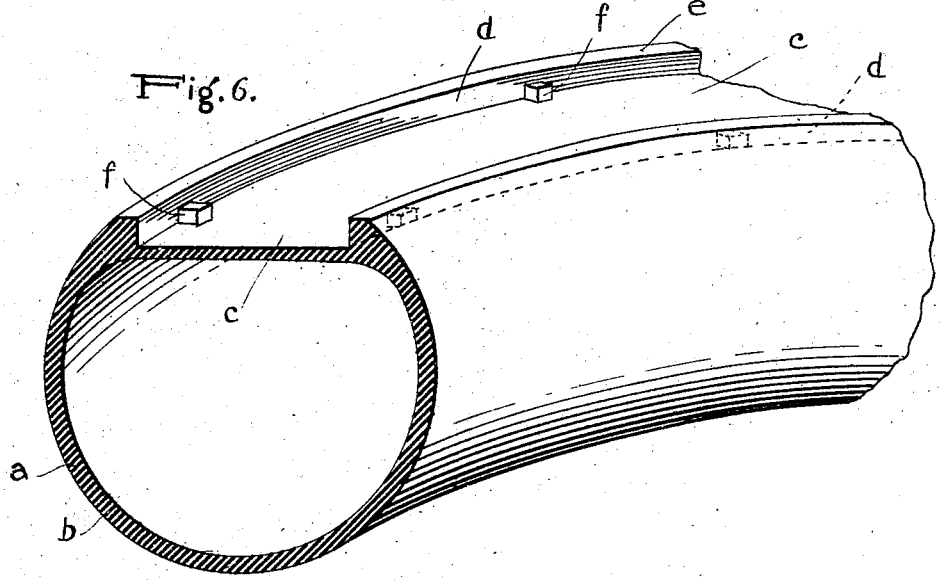
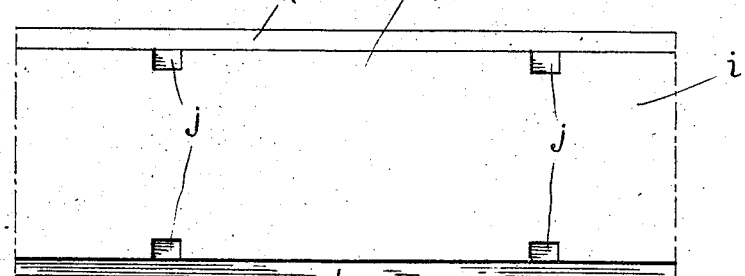
Inventor
Charles Scheuner
By E. W. Anderson
his Attorney
Witnesses
Stuart Hilder
George M. Anderson

UNITED STATES PATENT OFFICE.

CHARLES SCHEUNER, OF CHICAGO, ILLINOIS.

PNEUMATIC TIRE.

No. 903,891.

Specification of Letters Patent.

Patented Nov. 17, 1908.

Application filed June 12, 1907. Serial No. 378,471.

*To all whom it may concern:*

Be it known that I, CHARLES SCHEUNER, a citizen of the United States, resident of Chicago, in the county of Cook and State of Illinois, have made a certain new and useful Invention in Pneumatic Tires; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the tire, partly in section. Fig. 2 is an edge view of the tire with the tread or cover strip in section. Fig. 3 is a transverse section of the tire. Fig. 4 is a perspective detail view of a portion of the tread strip. Fig. 5 is a similar view of a portion of the armor-strip. Fig. 6 is a similar view of a portion of the tire proper. Fig. 7 is a bottom plan view of a portion of the tread strip.

The invention relates to armored pneumatic tires, designed chiefly for automobiles, and it consists in the novel construction and combinations of parts as hereinafter set forth.

In the accompanying drawings, illustrating the invention, the letter $a$, designates the body of the tire, formed, usually, of rubber, and having the interior air chamber $b$.

An annular recess $c$, is provided around the peripheral or tread portion of the tire which is of thickened character, such recess having vertical side walls $d$, joined to the cylindrical wall of the tire by an annular wall $e$, at right angles to the walls $d$. At intervals in the recess $c$, are provided angular lateral projections $f$, of square character extending from and joined to the side walls $d$, and cast in the rubber of the tire, such projections being of about half the height of such side walls. Fitting in the bottom of the recess $c$, is an annular metal plate $g$, formed usually of thin spring steel of about one thirty-second of an inch in thickness, and having its ends riveted or otherwise secured together, this metal strip having square notches at each side, which closely engage the lateral projections $f$, aforesaid. When this metal plate is in place its form is cylindrical. Upon the metal strip or plate in the recess $c$, is placed the annular tread strip $h$, formed usually of rubber, having a convex outer surface, as shown merging into the convex superfices of the tire, lateral flanges $h'$, fitting closely against the annular wall $e$, of the body of the tire, and an annular inward extending plug portion $i$, fitting closely against the metal armor strip aforesaid. The tread or cover strip is of greater thickness than the side walls of the tire, usually three or four times as thick, although, this is not essential, and of sufficient width to provide the full tread portion of the tire upon which the vehicle will rest at all times. Such cover strip is provided at intervals in the bottom of the plug portion thereof, with lateral notches $j$, fitting over the lateral projections $f$, and closely engaging the same.

In practice, the armor strip of metal is stretched tightly around the tire before having the ends riveted or secured together, and the outer cover or tread strip being expanded to ride over the side walls of the peripheral recess, all parts will be closely joined to form a unitary whole. Any slippage of the armor strip or the tread strip with relation to the tire or to each other is prevented by the engagement of the lateral projections $f$.

The use of the invention prevents penetration of the walls of the air chamber of the tire by all sharp obstructions, such as glass or tacks and even of a bullet fired from a gun, at the same time reducing the elasticity of the air cushion but little. Should the tread or cover strip become worn, it can be easily removed, and a new one expanded to place.

Having thus described my invention, what I claim and desire to secure by Letters Patent is—

1. An armored pneumatic tire including a body having a thickened outer portion, provided with an annular recess, the side walls of said annular recess having inward extending projections, and an annular armor strip of metal fitting in said recess and having lateral notches engaging said lateral projections, and an annular elastic tread strip fitting upon said armor strip in said recess and having lateral notches engaging said lateral projections.

2. An armored pneumatic tire including a body having a thickened outer portion provided with an annular recess, an annular armor strip of metal fitting in said recess, an annular elastic tread strip fitting upon said armor strip in said recess, said body being provided with positive locking means having engagement with said armor strip and said tread strip to prevent mutual slippage of the parts with respect to each other.

In testimony whereof I affix my signature, in presence of two witnesses.

CHARLES SCHEUNER.

Witnesses:
C. McParland,
D. J. McMahon.